United States Patent
Freeland et al.

[11] Patent Number: 6,135,872
[45] Date of Patent: Oct. 24, 2000

[54] METHOD AND APPARATUS FOR UNLOADING POULTRY

[75] Inventors: James P. Freeland, Spicer; Scott R. Christensen; Randy R. Alsleben, both of Willmar; Vernon G. Klasen, Melrose, all of Minn.

[73] Assignee: Hormel Foods Corporation, Austin, Minn.

[21] Appl. No.: 09/443,525

[22] Filed: Nov. 19, 1999

Related U.S. Application Data

[62] Division of application No. 08/788,850, Jan. 27, 1997, Pat. No. 6,056,637.

[51] Int. Cl.$^7$ ........................................................ A22B 3/00
[52] U.S. Cl. ............................................... 452/66; 452/57
[58] Field of Search ................................... 452/66, 57

[56] References Cited

U.S. PATENT DOCUMENTS

| | | | |
|---|---|---|---|
| Re. 28,708 | 2/1976 | Reynolds | 119/82 |
| 2,733,477 | 2/1956 | Murphy . | |
| 2,737,683 | 3/1956 | Regensburger . | |
| 2,978,737 | 4/1961 | Hughes . | |
| 3,118,174 | 1/1964 | Hughes . | |
| 3,702,600 | 11/1972 | Bright et al. | 119/82 |
| 3,706,300 | 12/1972 | Wessinger | 119/15 |
| 3,828,396 | 8/1974 | Wernberg . | |
| 3,958,536 | 5/1976 | Crowder | 119/82 |
| 4,092,761 | 6/1978 | McWhirter . | |
| 4,107,818 | 8/1978 | Scott et al. . | |
| 4,380,969 | 4/1983 | Thomas | 119/82 |
| 5,112,270 | 5/1992 | Howard et al. | 452/66 |
| 5,152,714 | 10/1992 | Audsley et al. | 452/66 |
| 5,186,677 | 2/1993 | Christensen et al. | 452/66 |
| 5,435,776 | 7/1995 | Owen et al. . | |
| 5,487,699 | 1/1996 | Tyrrell et al. | 452/66 |
| 5,643,072 | 7/1997 | Lankhaar et al. | 452/66 |
| 5,653,629 | 8/1997 | Audsley et al. | 452/66 |
| 5,788,564 | 8/1998 | Chamberlain | 452/66 |

*Primary Examiner*—Willis Little
*Attorney, Agent, or Firm*—Mau & Krull, P.A.

[57] ABSTRACT

Method and apparatus for unloading poultry as disclosed. A chute (35) is placed proximate the door of a coop. The door is opened and the poultry are urged out of the coop onto the chute (35). The poultry then slide down the chute (35) onto a conveyor (11), (15) which ultimately transfers the poultry to a gas stun vessel (25). The poultry are then transferred to a shackle line where they are shackled, without a full lift, and then proceed to an electrical stun (72) and killer (73). The gas stun vessel (25) includes a static mixer (53) for effectively mixing the $CO_2$ and air before delivery to the gas stun vessel (25).

4 Claims, 5 Drawing Sheets

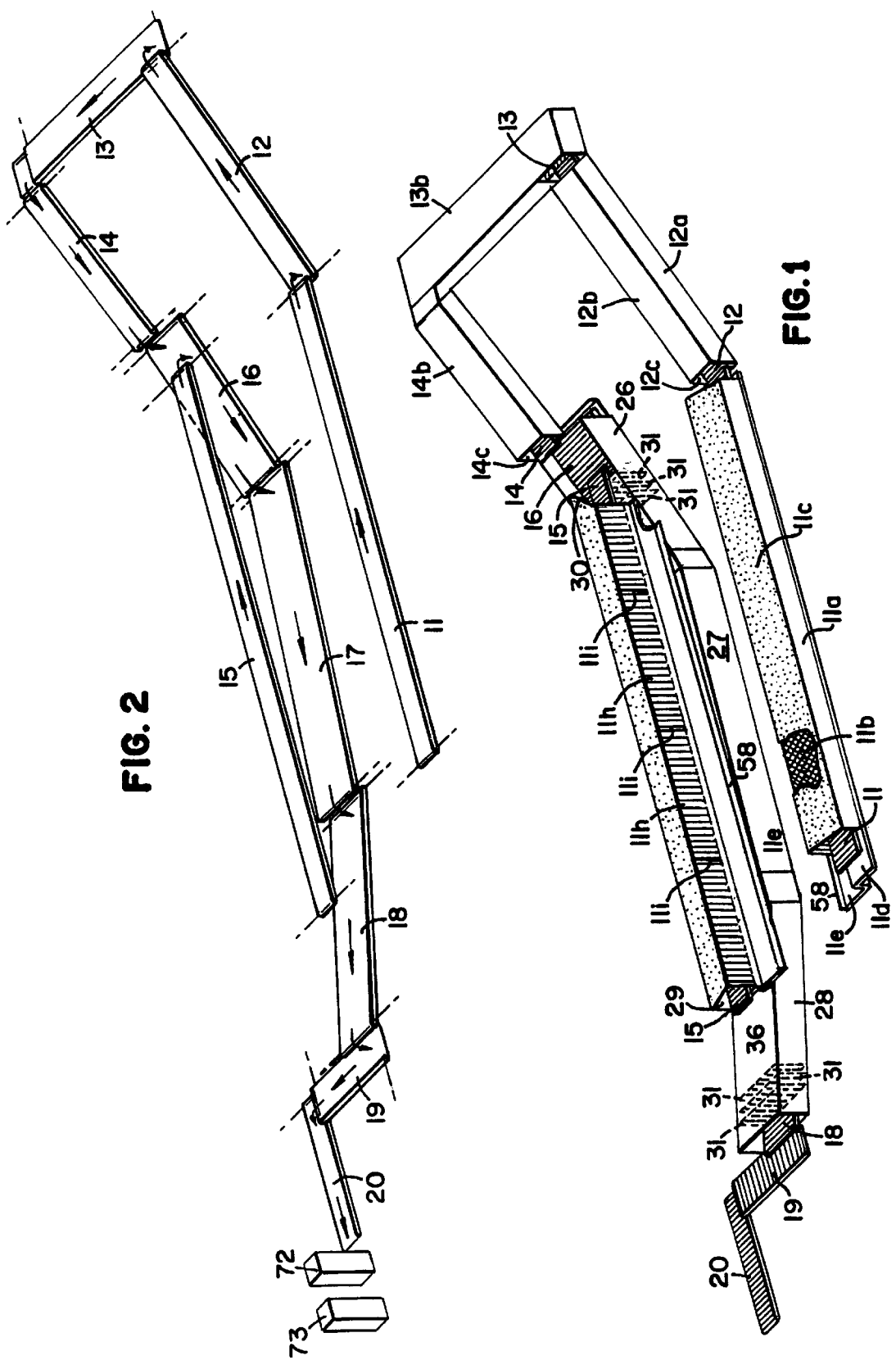

METHOD AND APPARATUS FOR UNLOADING POULTRY

This application is a divisional of Ser. No. 08/788,850 now U.S. Pat. No. 6,056,637 filed Jan. 27, 1997.

BACKGROUND OF THE INVENTION

1. Field of the Invention

This invention generally relates to unloading poultry, especially larger birds such as turkeys, and more particularly to unloading and processing poultry without the need of a full lift by the workers unloading the poultry.

2. Description of the Prior Art

The unloading of poultry is a very strenuous and labor intensive job. Typically, poultry is delivered to the processing plant in a plurality of coops that are loaded on a trailer bed. The trailer bed is usually positioned in a processing plant and the top row of coops are unloaded. This is done by the manual process of the workers reaching into the coops, pulling the birds out by their feet, and lifting and hanging the birds in shackles. The shackles then automatically deliver the poultry to the rest of the plant for processing. The entire trailer bed is then indexed upward and the next level of coops is able to be unloaded in a similar fashion.

For larger birds, such as turkeys, the weight of the birds can be in the 40–45 pound range. The unloading process subjects the workers to a risk of injury. In addition, it is a stressful time for the poultry and the poultry may be injured in this unloading process. Still further, as the poultry is being transferred by shackles, they are subject to further distress.

The poultry are then typically subjected to a stunning and killing operation. There have been several methods of stunning poultry with $CO_2$. Examples of these are U.S. Pat. Nos. 5,152,714 and 5,435,776. However, in the case of U.S. Pat. No. 5,435,776, the birds were still shackled prior to being subject to $CO_2$. U.S. Pat. No. 5,152,714 describes sending the broilers through in crates. However, broilers are typically substantially smaller than larger birds such as turkeys. Further, the patent discloses only a batch process and not a continuous manufacturing process.

The present invention addresses problems associated with prior art devices and provides for a method and apparatus for unloading and processing poultry without the necessity of full lift. The invention includes a method and apparatus for unloading the poultry without lifting the poultry out of coops. Further, a unique $CO_2$ recycling system is utilized for the stunning of the poultry.

SUMMARY OF THE INVENTION

The present invention is a method of unloading poultry, including positioning a trailer. The trailer has a plurality of coops filled with poultry and each coop has a door. An incline chute is positioned proximate the door of a coop. The door is opened and the poultry is urged onto the chute. The poultry are then allowed to slide down the chute onto a conveyor. In a preferred embodiment, the method also includes conveying the poultry into a continuous gas stunning chamber and rendering the poultry unconscious by means of $CO_2$. The conveyor then conveys the poultry from the stunning chamber to a shackling area. There, the legs of the poultry are lifted and placed into a shackle without the need for a full lift of the poultry.

The invention is also an apparatus for unloading and processing poultry. The poultry are initially delivered in a coop having a door. The apparatus includes an incline chute having first and second ends for positioning the first end next to the door of the coop. The first end is at an elevation higher than the second end. The apparatus also includes a conveyor which is positioned proximate the second end of the chute, the conveyor having a moving track. The chute has a roller positioned proximate the bottom. The roller is positioned in the track for movement along the track, wherein the chute may be indexed from a first coop to a second coop.

The invention is also a gas stunning apparatus for rendering poultry unconscious. The apparatus includes a stun vessel, the stun vessel being substantially gas tight except for an entrance and an exit. A conveyor runs through a stun vessel for transporting the poultry through the stun vessel. There is a source of $CO_2$ and a line for providing a flow of $CO_2$ from the source of $CO_2$ to the stun vessel. A blower is connected to the line for combining air and the $CO_2$ for delivery to a stun vessel.

BRIEF DESCRIPTION OF THE DRAWINGS

FIG. 1 is a perspective view of the apparatus for unloading poultry of the present invention showing the conveyor system as well as the gas stunning vessel;

FIG. 2 is a perspective view of just the conveyors shown in FIG. 1 for clarifying the movement on the conveyors and also shows schematically the electrical stun apparatus and the killer apparatus;

DETAILED DESCRIPTION OF THE INVENTION

Figure 3:
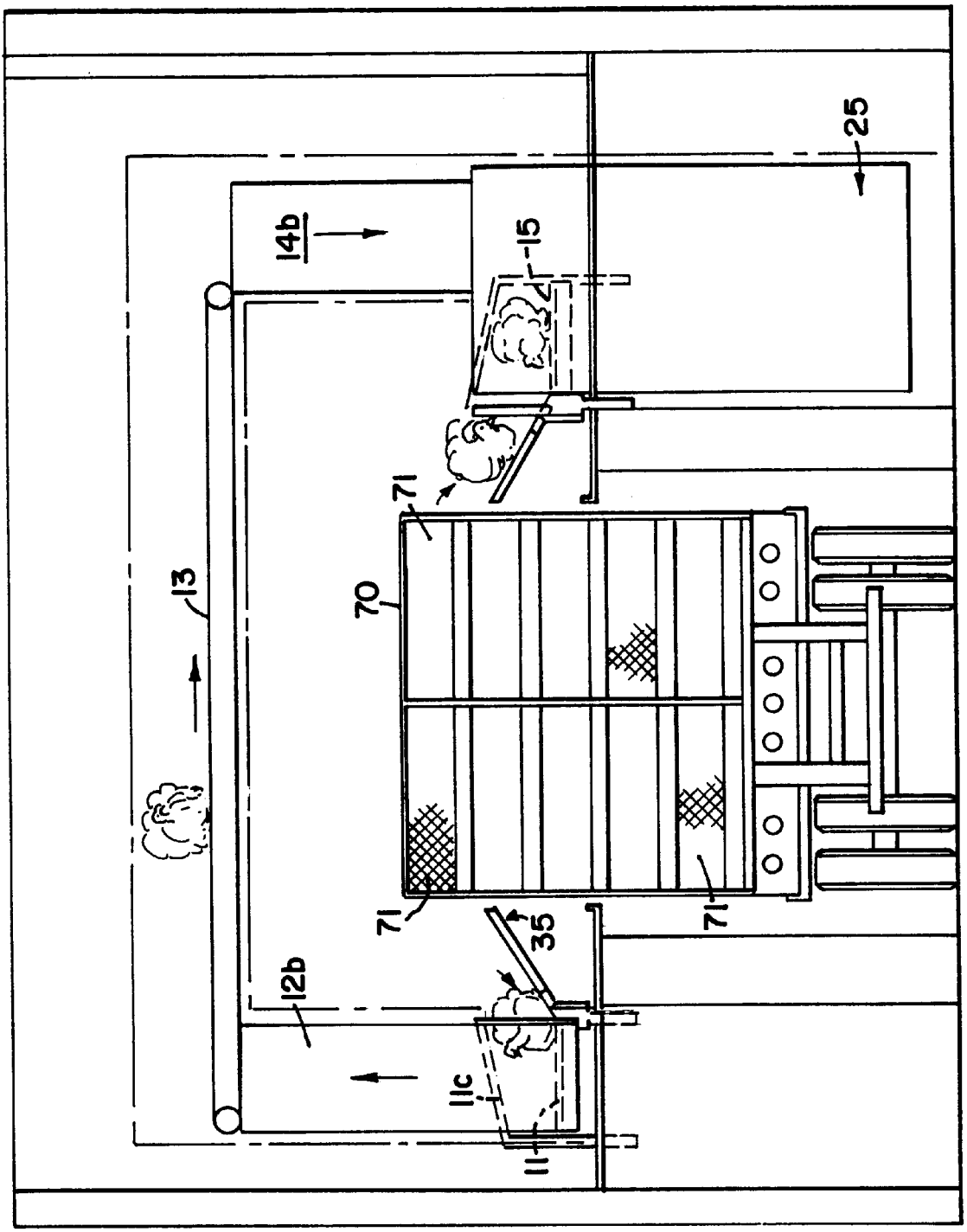
FIG. 3 is an elevational view of the apparatus shown in FIG. 1 installed around an unloading bay.

Referring to the drawing, wherein like numerals represent like parts throughout the several views, there is generally disclosed at 10 an apparatus for unloading poultry. While it may be used for any poultry, it is useful for use with large turkeys over 30 pounds and especially for heavier turkeys which may be 40–45 pounds. As the average weight of turkeys is increasing yearly, it is anticipated that this invention will be even more important as-the turkeys become larger. The apparatus includes a plurality of conveyors 11–20 shown schematically in the figures as only belts. However, the mechanical mechanisms to construct a conveyor are well known in the art and are accordingly not shown. Conveyers 11 and 15 are utilized for unloading the poultry from the coops. Transfer conveyors 12, 13, and 14 are utilized to move the poultry from conveyor 11 to conveyor 16. The poultry from conveyor 15 are also moved to conveyor 16 where the poultry from conveyors 11 and 15 are combined. It is noted that conveyor 12 is inclined upward and conveyor 14 is inclined downward. This is to enable the conveyors to go up and over to allow clearance for the truck that is driven into the unloading bay. Conveyors 16, 17, and 18 go through the gas stun vessel 25 and exit to a transfer conveyor 19 which brings the poultry to the shackling conveyor 20. As can be seen in FIG. 1, conveyors 11–15 are covered to provide a dark tunnel to transfer the poultry, thereby having a calming effect on the poultry. The majority of conveyor 16 is covered by the first section 26 of the stun vessel 25. The conveyor 17 is covered by the second section 27 of the gas stun vessel 25 and finally the conveyor 18 is covered by the third section 28 of the gas stun vessel 25, thereby also providing a dark environment for the poultry as they are rendered unconscious by $CO_2$. Conveyor 12 is covered by a housing having sides 12a, top 12b, and side 12c. The bottom of the conveyor 12 acts as a sufficient blockage for light and a separate bottom is not necessary, although one may be utilized, if desired to further reduce the light. Similarly, conveyor 14 has a housing which comprises sides 14a, top 14b, and side 14c. Conveyor 13 also has a housing comprising a side 13a, top 13b, and a second side (not shown) similar to 12c. Again, bottoms are optional for conveyors 13 and 14.

The housing for conveyors 12, 13 and 14 act as a housing to confine the poultry and also to make the transfer of the poultry in a dark environment. The housings may be made of any suitable material which is light impervious, such as metal which includes steel.

Figure 4:
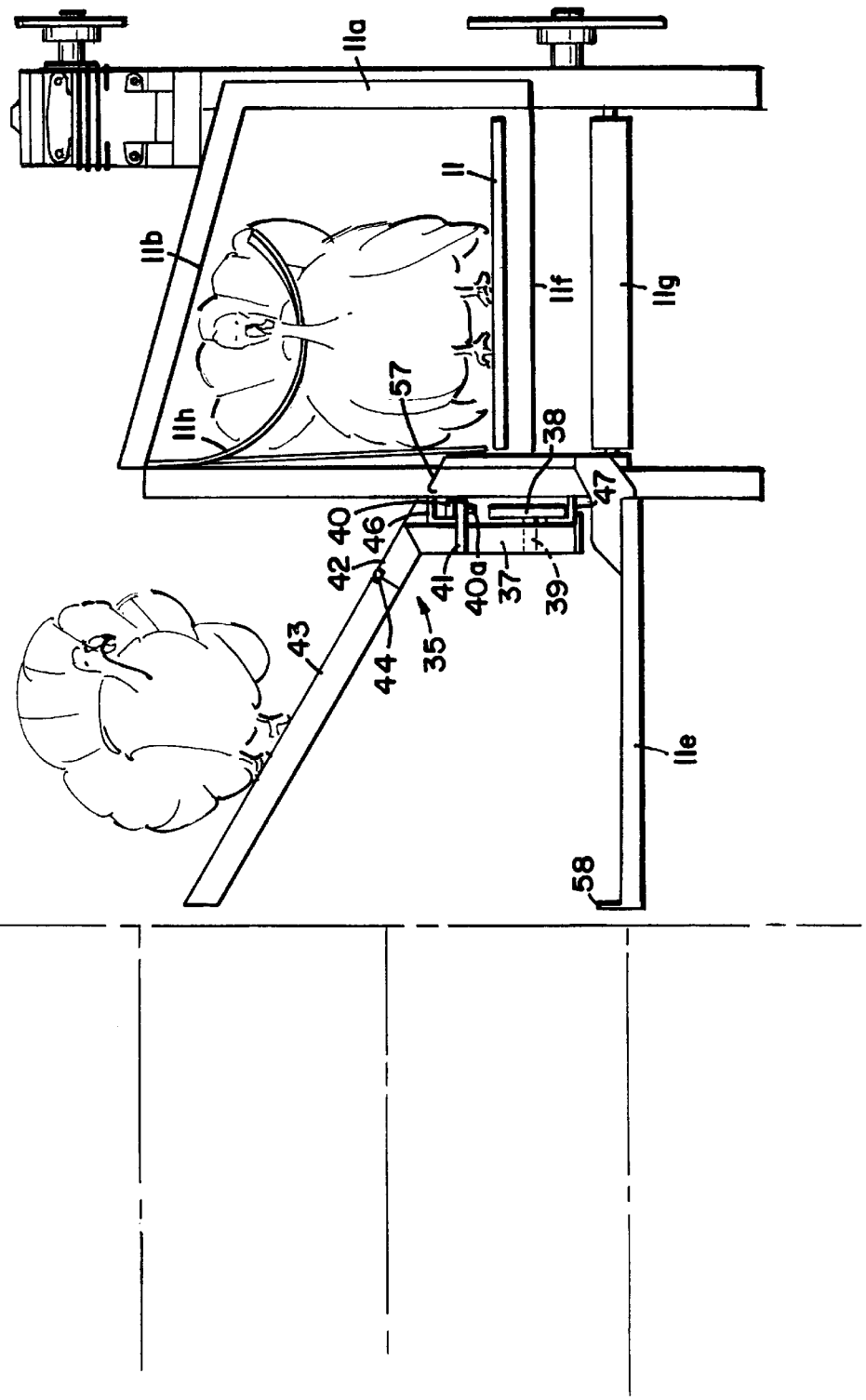
FIG. 4 is an enlarged end view of a portion of the apparatus shown in FIG. 3.

The housing around conveyors 1 and 5 is shown in FIGS. 1 and 4. The housings around the conveyors 11 and 15 are similar and therefore only one will be described in detail. However, it is understood that the other is identical, except for being a mirror image of the other. The housing comprising an outside side 11a operatively connected to a sloping top 11b. The side 11a is constructed of a material similar to that of the housings for conveyors 12–14. The top 11b is an open mesh wire that is covered by light impervious material such as cloth or belting 11c. The conveyor 11 is supported on a platform 11d. The platform 11d has an extension 11e which extends away from the inside of the conveyor toward the loading bay. A toe board 58 extends upward from the extension 11e. The extension 11e also provides a platform for the workers to stand on as they are unloading the poultry. A bottom 11f is operatively connected to the side 11a and is positioned between the conveyor belt 11 and the return roller 11g. The inner side of the conveyor housing is constructed from a flexible belt material such as a Habasit belt number SNB-AE. The belt 11h has slits which extend all the way to the bottom from just proximate the top 11b.

With such a construction, the turkeys are able to enter the housing to the conveyor 11 by simply forcing the individual sections of the belt 11h upward, as shown in FIG. 4. Then, as the poultry moves, the belt segments 11h are able to go back down to their vertical position forming a side which confines the poultry. While it is true that the poultry could exit the housing in a similar manner, with the darkness inside of the conveyor it has been found that the poultry do not try to escape and the belt 11h acts as a suitable confinement structure. Support posts 11i are positioned at suitable intervals along the inner side to give sufficient support.

A chute, generally designated 35 is operatively connected to a track which is in turn operatively connected to the inner side of the conveyor housing for conveyor 11 and 15. Since the chutes and tracks are identical, except for being mirror images thereof, only the chute and track for conveyor 11 is shown in FIG. 4. The chutes and track are not shown in FIG. 1 for clarity purposes. However, it is understood that they would normally be seen in FIG. 1 the same as shown in FIG. 4. A cross member 36 is operatively connected to the supports 11i across the inner portion of the conveyor 11. The track is operatively connected to the cross member 36 by a suitable means, such as welding. The track comprises a first L-shaped member 46 and a second L-shaped member 47. As will be discussed more fully hereafter, the L-shaped members 46 and 47 provide a guide path for guiding the chute 35.

The chute 35 comprises a first generally vertical member 37. Attached to the vertical member 37 is a ratable wheel 38. The wheel is attached by a suitable means such as a stub axle 39. An upper guide wheel 40 is operatively connected to the vertical member 37 by a connecting member 41. The upper guide wheel 40 has a stub axle 40a which connects it to the connecting member 41. A first inclined chute member 42 is operatively connected to a longer second incline chute member 43 by means of a hinge 44. Together, the incline chute members 41 and 42 form a surface on which the poultry may slide down. The chute members 42 and 43 are generally planar on their top surface. However, it is understood that other suitable surface configurations may also be utilized. The chute member is typically as wide as the door in the coops, or approximately 3 feet wide. The chute 35 is thereby adapted to be moved along the length of the conveyor 11, which allows the chute to unload coops along the length of the trailer 70. The chute 35 includes a hinge 44 so that as the trailer is raised up on a jack to allow the next lower level of coops to be unloaded, the second incline chute number 43 may be pivoted upwards so that there is additional clearance between the end of the chute 43 and the coops. This is necessary because the end of the chute 43 is typically positioned very close to the coops 71. As the trailer is raised, it is necessary that the chute be moved away from the trailer so as not to interfere with the upward movement. The hinge chute allows this to easily be accomplished. The hinge also allows the chute to be moved out of the way when a worker wants to walk between the chute and coops. A spacer 57 is positioned by the track to prevent the poultry from being caught in the open space before the conveyor 11. It is also understood that some unloading systems, such as the Ride-a-Track system keeps the truck stationary and indexes the shackle line. One skilled in the art would know how to utilize the present invention with such a system.

The $CO_2$ stun vessel 25, as previously indicated, has three sections 26–28. Each of the sections has two sides, a top and bottom operatively connected to form a substantially gas tight enclosure. The only openings are the exit 29 and entrance 30. As can be seen, the first section is inclined downward and the third section is inclined upward. This places the center section 28 at a lower elevation. Since $CO_2$ is heavier than air, the $CO_2$ will tend to congregate into the lower section 27 and will a lesser tendency to go out the entrance 30 or exit 29. However, since there would be a tendency for some of the $CO_2$ to possibly escape, three flexible doors are positioned at both the entrance 30 and the exit 29. The flexible doors 31 are all similarly constructed. The doors are constructed from the same material as the inner side of the conveyor housing for conveyors 11 and 15. That is, it is a length of flexible belt that has a plurality of vertical slits extending from proximate the top to all the way to the bottom. This allows for the poultry to enter and exit while still being transported on the conveyors but still acts as a barrier to the exiting of the $CO_2$. The flexible doors 31 are spaced at an appropriate interval, such as one foot, to allow the outer door to close behind the poultry before the front of the poultry pushes the inner flexible door open.

Figure 6:
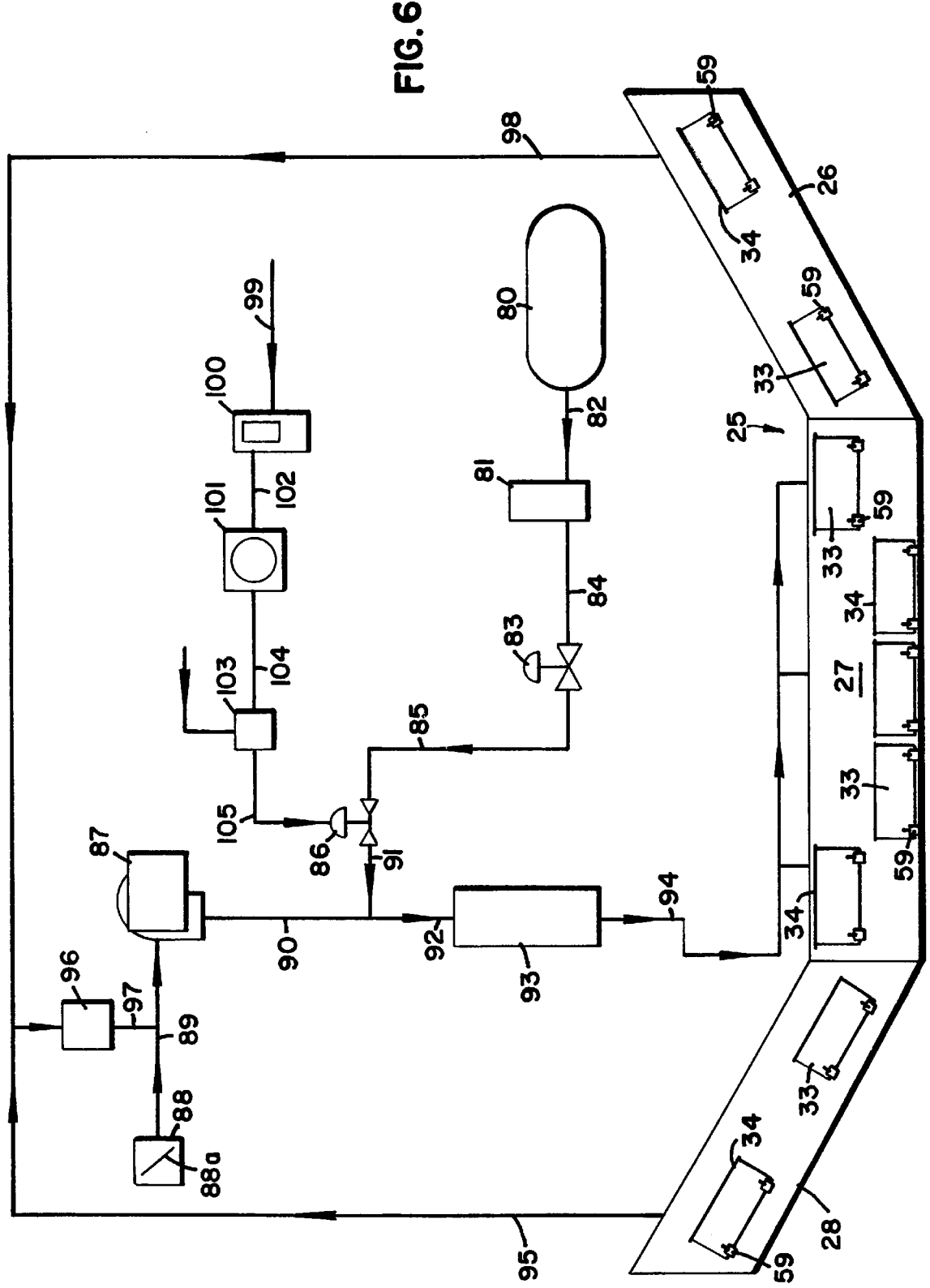
FIG. 6 is a schematic representation of the gas stunning vessel and the $CO_2$ control system.

The controls for the $CO_2$ are shown schematically in FIG. 6. A $CO_2$ storage tank and refrigeration unit 80 is in fluid communication with a $CO_2$ vaporizer 81 by a one inch $CO_2$ line 82. A pressure regulator 83 is in fluid communication with the $CO_2$ vaporizer by means of line 84. Typically, the pressure out of the $CO_2$ vaporizer 81 is approximately 300 psi. The pressure regulator 83 brings this pressure down to approximately 90 psi as the $CO_2$ travels through line 85 to a $CO_2$ control valve 86. A blower 87 has an intake 88 with a manual damper 88a connected by a line 89. The intake 88 allows for fresh air to be available to the blower 87. The output of the blower 87 is in fluid communication with a line 90. The line 90 also has a $CO_2$ input through line 91 which is in fluid communication with the $CO_2$ control valve 86. The output from the blower 87 and the line 91 are then combined and travel through line 92 to a static mixer 93. As the combination of air and $CO_2$ goes through the static mixer 93, the air and $CO_2$ are mixed to provide an even distribution of the $CO_2$ and air. This then exits the static mixer 93 through output line 94 which is in fluid communication with the stun vessel 25. The line 94 is in fluid communication with the second section 27 at three locations. Three suitable fittings (not shown) are connected to the middle section 27 and the line 94 connects to all three of the fittings. This allows for the gas in line 94 to enter the stun vessel 27 at any of the three locations. Each fitting may be opened or closed to allow for the proper flow of $CO_2$ and air into the stun vessel 27. Typically, the gas combination would enter the fitting closest to the first section 26 to make certain that there is a good concentration of $CO_2$ at that point. However, if due to the configuration of the stun vessel and $CO_2$ supply, it is advantageous to move the entrance to one of the other two fittings it may easily be done by opening the other fittings and closing the fitting closest to the section 26.

The stun vessel 25 has a plurality of doors in sections 26–28. The doors are to provide access to the interior of the stun vessel 25 so that maintenance may be done. Also, they allow for openings into which a sample line may be run, as will be described more fully hereafter. The doors 32 may take one of many suitable configurations as long as they provide for a gas-tight seal. As shown in FIG. 6, the doors 32 have a front panel 33 attached to the gas stun vessel 25 by means of a hinge 34. Latches 59 are provided to secure the front panel 33 in a closed gas-tight position. A gasketing material may be positioned between the front panel 33 and the stun vessel 25 so as to ensure a gas-tight fit.

Proximate the exit of section 28 is located a recycle line 95 which is in fluid communication with the top of the third section 38 by a suitable means such as a fitting. The other end of the line 95 is in fluid communication with an air filter 96. The outlet of the air filter 96 is in fluid communication with the line 89 by means of a line 97. Similarly, another recycle line 98 is in fluid communication with the first section 26 proximate the entrance. The second end of the line 98 is also in fluid communication with the air filter 96. A plurality of sample ports (not shown) are positioned throughout the stun vessel 25. The ports are releasably connected to a sample line 99. This allows the sample line 99 to be connected to any one of the sample ports to allow various areas to be sampled. The sample line 99 is connected to a Ranarex gas analyzer 100. The $CO_2$ mixture in the sample is then analyzed in the gas analyzer 100 and an electrical output is transmitted to the Honeywell Truline Recorder With Controller 101 by means of an electrical connection 102. The controller 101 is electrically connected to a Honeywell I/P transducer 103 by means of an electrical connection 104. The transducer converts this to an output in psi and is operatively connected to the control valve 86 by means of connection 105.

The control mechanism for the $CO_2$ along with the stun vessel 25 provides for an effective means to stun the poultry and render the poultry unconscious by the time poultry exit the stun vessel 25. The $CO_2$ is supplied to the control valve 86. The amount of $CO_2$ which is allowed to pass through the control valve $CO_2$ is dependent upon the sample of the gas mixture inside of the stun vessel 25. This input comes through sample line 99 and controls the control valve 86 to meter the correct amount of $CO_2$ into line 91. The $CO_2$ gas mixture inside of the stun vessel 25 is recycled through recycle lines 95 and 98 to the blower 87 which takes this combination of recycled $CO_2$ gas mixture and mixes it with fresh air through the intake 88. The output from the blower 87 into line 90 is then mixed with the $CO_2$ coming out of line 91 into line 92. The $CO_2$ and gas mixture coming from line 90 is thoroughly mixed within the static mixer 93. The static mixer 93 may be a suitable mixer, such as Koch Model SMVL, but typically the mixer 93 has a plurality of baffles to make the gas turbulent to fully mix the gas. Applicant has found that a mixture of 40% $CO_2$ and 60% air is best. By having a good mixture of the air in the $CO_2$ supplied to the poultry, the poultry breath the $CO_2$ mixture and do not struggle because they can not distinguish this from normal air. If the concentration of $CO_2$ becomes too high or approaches 100%, the poultry can sense that they are not breathing proper air and begin to struggle. The control valve 86, transducer 103, controller 101, gas analyzer 100 are well known in the art to control the amount of $CO_2$. The damper 88a of the fan is manually adjusted for fresh air.

A second gas analyzer (not shown in FIG. 6) may be utilized for sampling various points inside of the stun vessel 25. The readings from this gas analyzer may be used to determine where the line 94 may be used to adjust where the line 94 enters the stun vessel 25.

Figure 5:
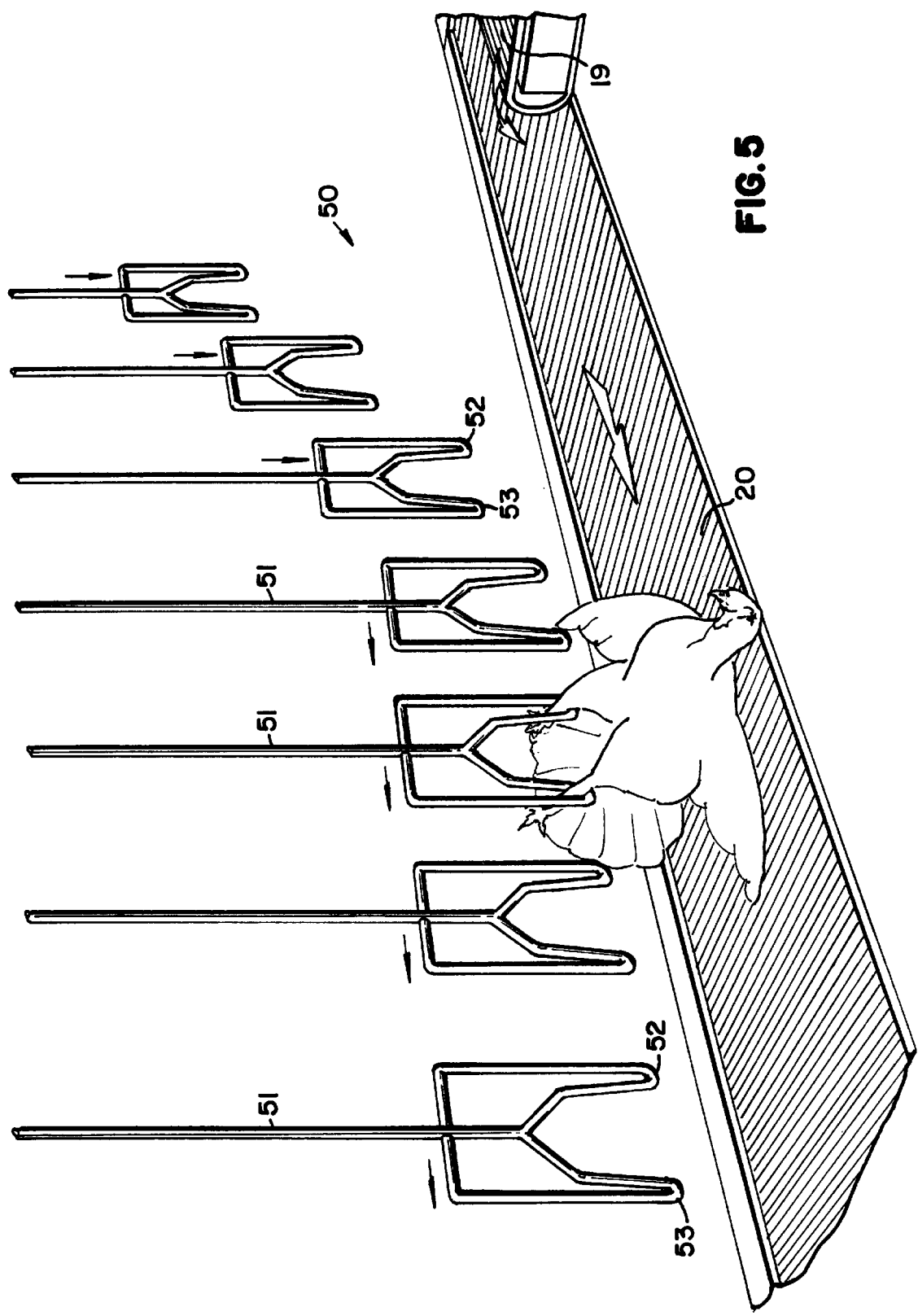
FIG. 5 is an enlarged perspective view of a portion of the unloading apparatus shown in FIG. 1 also showing the shackle line.

When the poultry exits the stun vessel 25 they are transferred to a transfer conveyor 19 which in turn transfers the poultry to the shackle line, generally designating it as 50. The shackle line 50 is shown in FIG. 5. Only one turkey is shown in FIG. 5, but it is understood that there would be a number of turkeys or poultry being transferred from conveyor 19 through conveyor 20. A first worker (not shown) would stand next to the conveyor 19 and position the birds to a position as shown in FIG. 5. Then, another worker would take the birds' legs and place them into shackles 51. The shackles 51 are well known in the art and have two U-shaped members 52 and 53 which form a slot for receiving the legs of the poultry. The shackles are connected to an overhead line (not shown) and the shackles move in a downward direction as well as in the direction of the conveyor 20 until they are in position for receiving the legs of the poultry. Then, the shackles continue on in the direction of the conveyor 20 and then begin to move upward so that the poultry is hanging by its feet. The shackled poultry then go to an electric stun device 72 and then to a killer 73. The electrical stun 72 and killer 73 are well known in the art and may be in a suitable unit such as a Simmons Model SF7000 and Simmons Model SK5.

In operation, the trailer 70 having a plurality of coops 71 is brought into the unloading bay, as shown in FIG. 3. There are typically two coops across the width of the trailer. One side of the trailer is unloaded to conveyor 11 and the other side is unloaded to conveyor 15. Also, there are a plurality of levels of coops on the trailer. As shown in FIG. 3, there are five levels of coops. The chutes are designed so that the end of the second incline chute 43 is just below the door opening in the top level of the coops. Then, after the top level has been unloaded along the length of the trailer, the trailer is indexed upwards by means of jacks (not shown) until the end of the second incline chute member 43 is positioned proximate the opening of the doors in the second level of coops.

The unloading of each side is identical and therefore the unloading onto conveyor 11 will be described in more detail as shown in FIGS. 3 and 4. As the trailer 70 is initially brought into the loading bay, the chute 35 is rotated about hinge 44 to bring the end of the chute member 43 away from the trailer. Then, once the trailer 70 is in position the chute member 33 is pivoted downward to the position as shown in FIGS. 3 and 4. This provides for a continuous surface for the poultry to slide down. The extension platform 11e provides a platform on which the worker may stand while unloading the poultry. The worker opens the door of the coop 71 and then reaches into the coop 71 and urges or pulls the poultry onto the chute 43. The poultry then slides down the chute 43 onto the conveyor 11 through the slit belting 11h. It is not necessary that the poultry be lifted as it is only necessary that they be slid out of the coop and onto the chute 35 where gravity then finishes the transfer onto the conveyor 11. Once the end coop 71 is unloaded, the chute 35 is pushed along the length of the track until it reaches the next coop. Then the process of unloading the poultry is repeated in that coop. The chute 35 is continued to be indexed down the length of the track until it reaches the end coop. Then, the chute member 43 is pivoted upwards and the trailer is indexed upwards and the same process is repeated for the second level of coops. The poultry is then in the confined housing of either conveyor 11 or 15.

From conveyor 11, the poultry is transferred to conveyor 12 with its enclosed housing to again provide a dark environment. Upon transfer to conveyor 13 the poultry is also again in a closed dark environment as it is when it is transferred to the conveyor 14. At this time, the poultry is transferred from the conveyor 14 to conveyor 16.

At the same time, poultry is being deposited onto conveyor 16 through conveyor 15. Therefore, both sides of the trailer are unloaded and the poultry all ends up on conveyor 16 which enters the stun vessel. As the poultry enter the stun vessel 25 through the flexible doors 31, they begin breathing the 40% $CO_2$ air. The speed of the conveyors 26, 27, and 28 is timed so that by the time the poultry exit through the flexible doors 31 at the exit 29, the poultry are unconscious. Then they are transferred onto conveyor 19 and then to conveyor 20 where the hanging in the shackles takes place, as previously described. When the worker lifts the legs of the poultry into the U-shaped members 52 and 53 of the shackle, it is not necessary that the poultry's body be lifted off of the conveyor. Instead, the shackles are positioned at a height from the conveyor 20 such that it is only necessary that the legs be lifted up and into the shackles while the main portion of the poultry is still on the conveyor belt 20 and supported thereby. The shackle line then takes the poultry to the electrical stun 72 and then to the killer 73.

While the poultry are unconscious after breathing the $CO_2$, the electrical stunning apparatus 72 allows the neck to hang loose as it goes through the head cutter or killer 73, thereby facilitating a better kill ratio. If only $CO_2$ has been used, the kill rate is only 20–25%. By combining with electrical stunning, a 97% kill rate is achieved. The poultry then proceed through the plant to finish all of the processing steps. The steps are conventional and need not be described further as they are well known in the art.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A gas stunning apparatus for rendering poultry unconscious, comprising:
   a) a stun vessel, the stun vessel being substantially gas tight except for an entrance and an exit;
   b) a conveyor running through the stun vessel for transporting the poultry through the stun vessel;
   c) a source of $CO_2$;
   d) a line for providing a flow of $CO_2$ from the source to the stun vessel;
   e) a blower connected to the line for combining air and $CO_2$ for delivery to the stun vessel; and
   f) a return line operatively connected to the stun vessel and the blower, wherein the $CO_2$ is recycled.

2. The apparatus of claim 1, further comprising a mixer operatively connected to line, wherein the $CO_2$ and the air are mixed prior to entry to the stun vessel.

3. The apparatus of claim 1, further comprising the stun vessel having first, second and third sections, said first section inclined downward to the second section and the third section inclined upward from the second section.

4. The apparatus of claim 1, further comprising:
   a) a control valve operatively connected between the source of $CO_2$ and the line;
   b) a $CO_2$ gas analyzer operatively connected to the stun vessel to sample a level of $CO_2$; and
   c) a controller for operating the control valve in response to the $CO_2$ gas analyzer.

* * * * *